United States Patent [19]

Wickman et al.

[11] 4,086,814

[45] May 2, 1978

[54] PRESSURE SENSING SYSTEM

[75] Inventors: Harold C. Wickman, 17619 Mulberry Dr., Country Club Hills, Ill. 60477; James M. Taylor, Chicago, Ill.

[73] Assignee: Harold C. Wickman, Country Club Hills, Ill.

[21] Appl. No.: 779,544

[22] Filed: Mar. 21, 1977

[51] Int. Cl.² ............................................. G01L 9/00
[52] U.S. Cl. .................................................... 73/717
[58] Field of Search .......... 73/398 AR, 398 R, 398 C; 200/81.4, 81.5; 338/42

[56] References Cited

U.S. PATENT DOCUMENTS 3,277,441  10/1966  Gutjahr ............................. 200/81.4
3,952,284  4/1976  Martin ............................... 200/81.4

Primary Examiner—Donald O. Woodiel
Attorney, Agent, or Firm—George H. Gerstman

[57] ABSTRACT

Apparatus for displaying pressure in digital form including a plurality of pressure-sensitive transducers arranged in a vertical linear array within a liquid container, from a most sensitive position to a least sensitive position. Electronic matrix means responsive to actuation of the transducers provide an output signal indicative of the least sensitively positioned transducer that has been actuated. A digital display device is coupled to the output of the electronic matrix means and is responsive to the output signal, for displaying in digital form the pressure in the container.

12 Claims, 2 Drawing Figures

PRESSURE SENSING SYSTEM

BACKGROUND OF THE INVENTION

This invention relates to apparatus for sensing and displaying pressure and, more particularly, improved electronic apparatus for displaying pressure in digital form.

An object of the present invention is to provide apparatus for displaying pressure in digital form, which is simple in operation and efficient to manufacture.

A further object of the present invention is to provide solid state electronics to achieve an inexpensive and efficient construction for displaying pressure in digital form.

Other objects and advantages of the present invention will become apparent as the description proceeds.

SUMMARY OF THE INVENTION

In accordance with the present invention, there is provided a plurality of pressure-sensitive transducers arranged for positioning within a location wherein the pressure is to be sensed. The pressure-sensitive transducers are arranged from a most sensitive position to a least sensitive position. Electronic matrix means are responsive to actuation of the transducers providing an output signal indicative of the least sensitively positioned transducer that has been actuated. In this manner, a signal indicative of the pressure at the location is provided.

A digital display device is coupled to the output of the electronic matrix means. The digital display device is responsive to the output signal for displaying in digital form the pressure at the location.

In the illustrative embodiment, the location is a container for containing liquid and the pressure-sensitive transducers are arranged vertically within the container and are responsive to liquid pressure. The pressure-sensitive transducers include a miniature device in which a diaphragm, responsive to pressure, switches an electrical circuit.

In the illustrative embodiment, the electronic matrix comprises means for inhibiting transmission of certain output signals so that an output signal only indicative of the least sensitively positioned transducer will be provided. The inhibiting means of the illustrative embodiment comprises exclusive OR gates coupled to the pressure-sensitive transducers and to each other. A diode is coupled to the output of each of the exclusive OR gates with the exclusive OR gates and diodes forming a binary coded decimal diode matrix for providing a BCD output signal indicative of the least sensitively positioned transducer that has been actuated. Means are provided for decoding the BCD output signal and for providing a decimal signal to the digital display device.

A more detailed explanation of the invention is provided in the following description and claims, and is illustrated in the accompanying drawings.

DETAILED DESCRIPTION OF THE ILLUSTRATIVE EMBODIMENT

Figure 1:
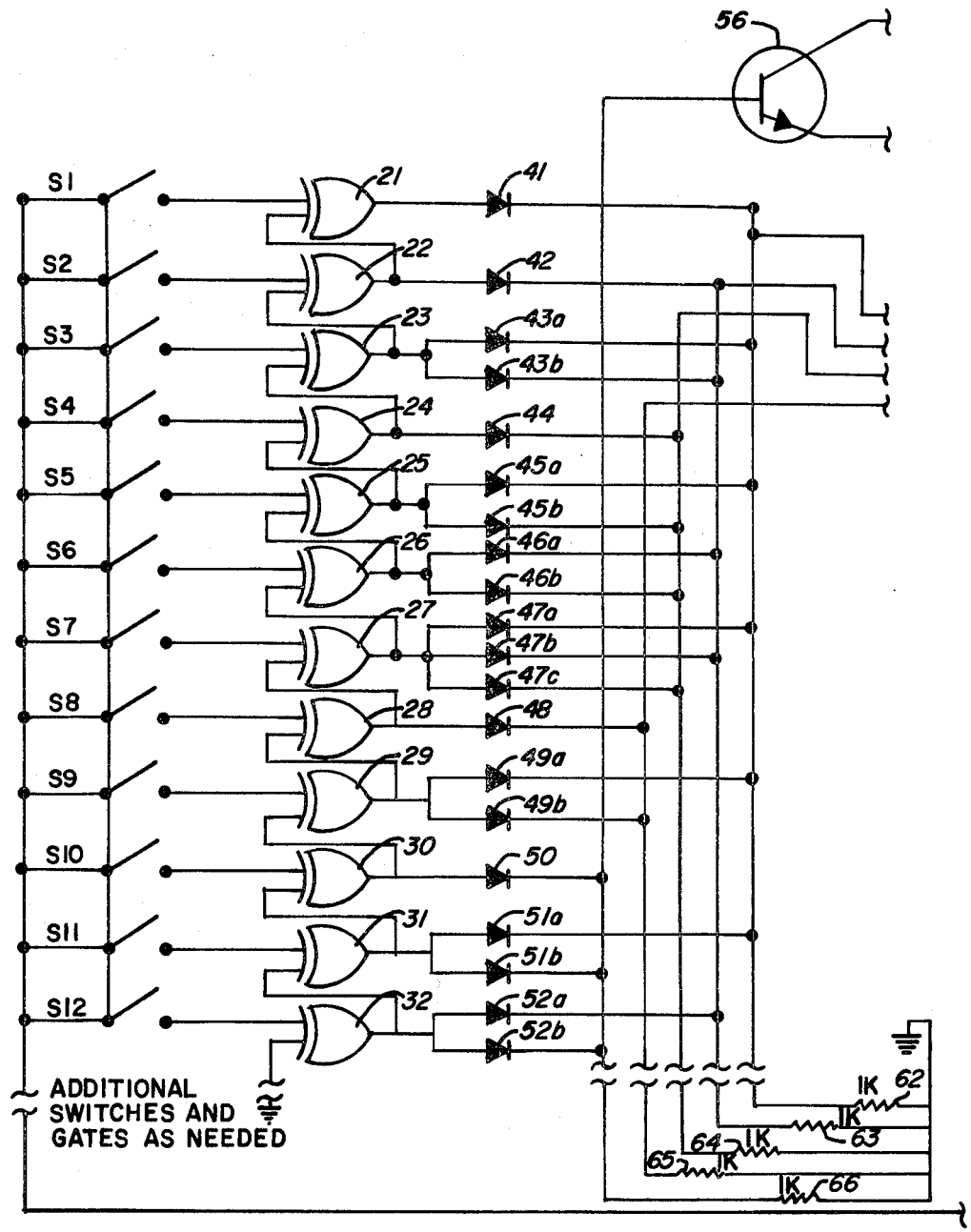
FIGS. 1 and 2, when connected together, form a schematic circuit diagram of apparatus constructed in accordance with the principles of the present invention for displaying pressure in digital form.
Figure 2:
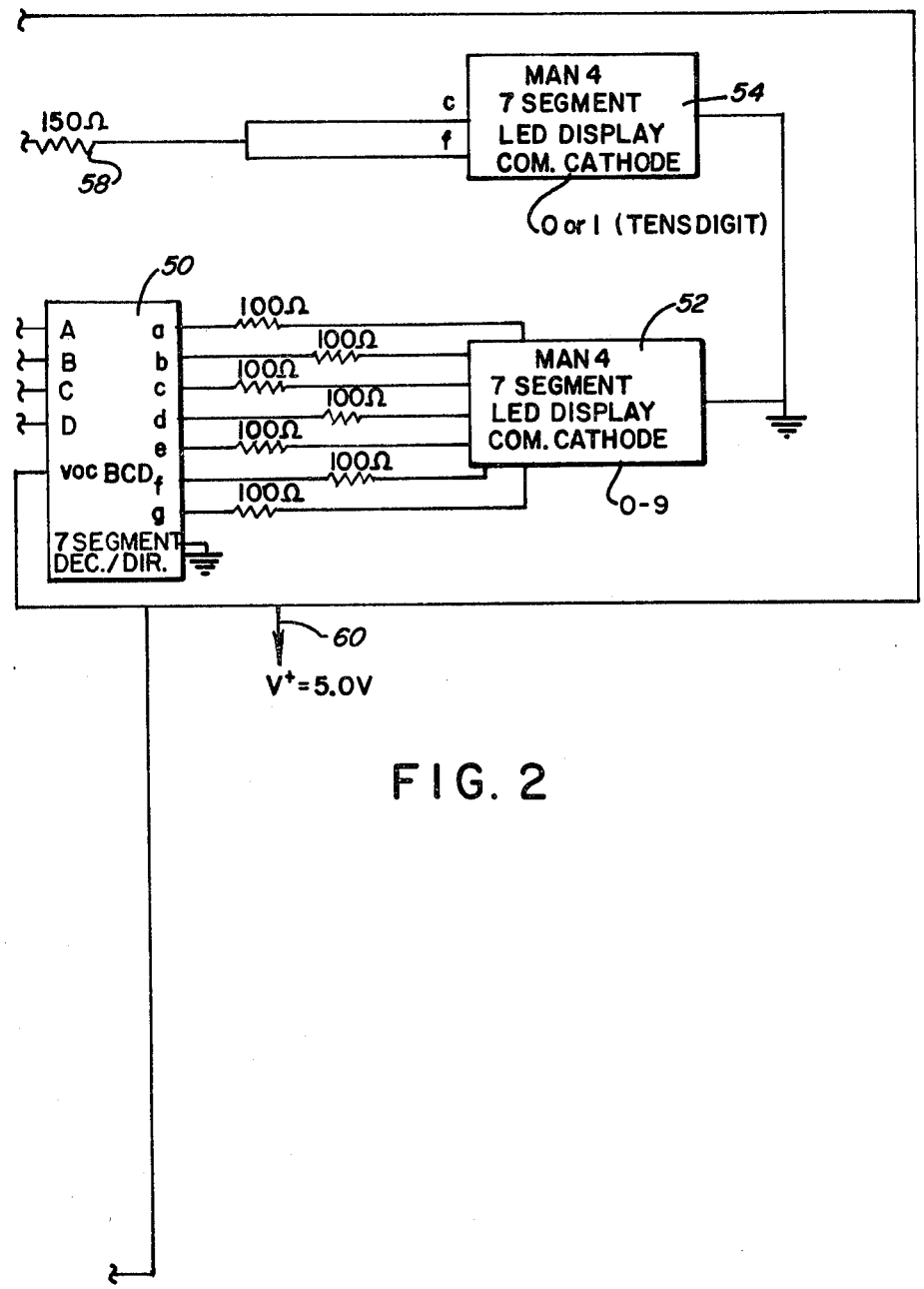

Referring to the drawings, there is shown therein a plurality of pressure-sensitive switches S1, S2, S3, S4, S5, S6, S7, S8, S9, S10, S11 and S12. No limitation is intended with respect to the number of switches, and thus there could be more or less switches, depending upon the particular pressure-sensing application.

Switches S1 through S12 close in sequence, that is, S1 is the most sensitive, S2 is less sensitive, S3 is less sensitive than S2, etc. and S12 is the least sensitive switch. In this manner, S1 will close first, S2 will close thereafter, S3 will close thereafter, and so forth with S12 being the last switch of the series to close as it is the least sensitive switch. In effect, S1 will indicate the least pressure and S12 will indicate the most pressure. When one of the switches is closed, all of the more sensitive switches are also closed. For example, if S8 is closed, S1 through S7 have already closed.

Switches S1 through S12 are miniature pressure-sensitive switches and are preferably of a type in which a diaphragm is moved in response to pressure, causing electrical contacts to close. While no limitation is intended, types of switches which may be used in various applications are disclosed in U.S. Pat. Nos. 3,594,522, 3,267,233, 3,862,387, 3,743,801, I.B.M. Technical Disclosure Bulletin Volume 14, No. 3, August, 1971 entitled "Pressure Sensitive Elastic Diaphragm Switch"and I.B.M. Technical Disclosure Bulletin Volume 6, No. 5, October, 1963 entitled "Pneumatic To electric Transducer".

Each pressure-sensitive switch is in series with an exclusive OR gate which feeds to a binary coded decimal (BCD) diode matrix. In the illustrative embodiment, switch S1 is connected to an input of exclusive OR gate 21, S2 is connected to an input of exclusive OR gate 22, S3 is connected to an input of exclusive OR gate 23, S4 is connected to an input of exclusive OR gate 24, S5 is connected to an input of exclusive OR gate 25, S6 is connected to an input of exclusive OR gate 26, and so forth, with S12 being connected to an input of exclusive OR gate 32.

The other input of exclusive OR gate 21 is connected to the output of exclusive OR gate 22, the other input of exclusive OR gate 22 is connected to the output of exclusive OR gate 23, and so forth, with the other input of exclusive OR gate 31 being connected to the output of exclusive OR gate 32 and the other input of exclusive OR gate 32 being connected to ground.

Each of the outputs of the exclusive OR gates are connected to one or more diodes as illustrated in the drawing. Thus the output of exclusive OR gate 21 is connected to diode 41, the output of exclusive OR gate 22 is connected to diode 42, the output of exclusive OR gate 23 is connected to diodes 43a and 43b, the output of exclusive OR gate 24 is connected to diode 44, the output of exclusive OR gate 25 is connected to the anodes of diodes 45a and 45b, and so forth as illustrated in the drawing.

The diode matrix comprising diodes 41 through 52 form a matrix to provide a binary coded decimal input to the four input terminals A, B, C, D of a seven-segment decoder/driver 50. It can be seen that when switch S1 is closed, a signal is fed to input A of decoder/driver 50, and no signal is fed to any of the other inputs. Likewise, when switch S2 is closed, a signal is fed to input B of decoder/driver 50, with no signal being fed to any of the other inputs. When switch S1 is closed, a signal is fed to inputs A and B of decoder/driver 50, with no signals being fed to any of the other inputs. In a similar manner, the closure of each of the less sensitive switches will cause the respective signals designating the least sensitive switch that has been closed to be binary coded to the decoder/driver 50. The exclusive OR gates 21 through 32 allow response of the system to the highest switch closed, i.e., the least sensitive switch or the switch indicating the greatest pressure. Thus if switches S1 through S4 are closed, because of the exclusive OR gate action only diode D5 will be conducting and providing a signal to input C of decoder/driver 50.

It is thus seen that the inputs A, B, C and D of the seven-segment decoder/driver 50 are BCD inputs with A representing a 1, B representing a 2, C representing a 4 and D representing an 8. The outputs of decoder/driver 50 are in decimal and are fed to a seven-segment LED display 52 in the conventional manner. Display 52 will indicate, in digital form, a number between 0 and 9. Thus if pins A, B and C are each reading a binary 1, the output of the decoder will feed the signal for a 7 to the LED display 52.

While LED display 52 displays 0 through 9, LED display 54 displays either a 0 or a 1, indicating the 10's digit. If a 0 is being displayed on seven-segment LED display 54, the number is less than 10. If a 1 is being displayed by LED display 54, this is the 10's digit indicating that a 10 plus the number of the LED display 52 is the actual number. It is preferred that LED display 54 be positioned to the left of LED display 52 so that a number 7, for example, will read 07 and so that the number 11, for example, will read 11. Of course, the zero pin of LED display 54 could be disconnected so that no light will be emitted for a zero.

In order to operate the LED display 54, an NPN transistor 56 is used, with its base being connected to the cathodes of diodes 50, 51b and 52b, indicating a 10's digit. The emitter of transistor 56 is connected to LED display 54 through a resistor 58, in the conventional manner, with the collector voltage being provided by a suitable DC source coupled to line 60.

The BCD diode matrix is also connected to a series of pull-down resistors 62, 63, 64, 65, 66, which are connected to ground, as illustrated in the drawing. In this manner, the decoder/driver does not sense a logic 1 when it should be a logic 0. Thus when a diode conducts, the decoder/driver will properly sense a logic 1 at one or more of its input terminals A, B, C and D as described above. As stated above, NPN transistor 56 operates for the digits higher than 9, i.e., for the 10's digit to provide the extra logic 1 to the LED display 54.

Although no limitation is intended, in the illustrative example decoder/driver 50 is a type 7448 BCD/seven-segment decoder/driver, exclusive OR gates 21 through 32 are type 7486 exclusive OR gates, diodes 41 through 52 are type 1N914 diodes and NPN transistor 56 is a type 2N4400 NPN transistor. The circuit illustrated herein can be easily expanded by adding additional switches, gates, drivers and displays as required by the particular pressure-sensing operation. The pull-down resistors 62 through 66 may be 1K resistors, although no limitation is intended, resistor 58 may be a 150 ohm resistor, and the resistors coupling the decimal output of decoder/driver 50 to the LED display 52 may be 100 ohm resistors. These parameters are for illustrative purposes only and many other equivalent parameters may be used.

The circuit described herein is particularly useful for providing an efficient digital display of the pressure in a liquid container. For example, switches S1 through S12 may be placed, in linear array vertically in the container, with S1 being adjacent the bottom of the container and S12 being adjacent the upper portion of the container. As the pressure increases, the pressure-sensitive switches S1 through S12 will close in sequence, providing an indication, in digital form, of the pressure within the container, in the manner explained above. The system may be powered by a low voltage DC source, such as the automobile battery in an automobile application. Further, the system may be formed entirely as an integrated circuit or may be encapsulated, as desired, in order to provide a small, effective unit.

Although an illustrative embodiment of the invention has been shown and described, it is to be understood that various modifications and substitutions, and other applications with respect to pressure-sensitive systems having digital display, may be made without departing from the novel spirit and scope of the present invention.

What is claimed is:

1. Apparatus for displaying pressure in digital form, which comprises: a plurality of pressure-sensitive transducers arranged for positioning within a location wherein the pressure is to be sensed, said pressure-sensitive transducers being arranged from a most sensitive position to a least sensitive position; electronic matrix means responsive to actuation of said transducers for providing an output signal indicative of the least sensitively positioned transducer that has been actuated, whereby a signal indicative of the pressure at the location is provided; a digital display device coupled to the output of said electronic matrix means, said digital display device being responsive to said output signal for displaying in digital form the pressure at the location.

2. Apparatus for displaying pressure in digital form as described in claim 1, wherein said location is a container for containing liquid and said pressure-sensitive transducers are arranged vertically within said container and are responsive to liquid pressure.

3. Apparatus for displaying pressure in digital form as described in claim 2, wherein each of said pressure-sensitive transducers includes a miniature device in which a diaphragm, responsive to pressure, switches an electrical circuit.

4. Apparatus for displaying pressure in digital form as described in claim 1, wherein said pressure-sensitive transducers are arranged in a linear array.

5. Apparatus for displaying pressure in digital form as described in claim 4, wherein said linear array is at least partially encapsulated.

6. Apparatus for displaying pressure in digital form as described in claim 1, said electronic matrix means comprising means for inhibiting transmission of output signals indicative of all of the more sensitively positioned transducers than the least sensitively positioned transducer that has been actuated, whereby an output signal only indicative of the least sensitively positioned transducer will be provided.

7. Apparatus for displaying pressure in digital form as described in claim 6, said inhibiting means comprising exclusive OR gates coupled to said pressure-sensitive transducers and to each other, and a diode coupled to the output of each of said exclusive OR gates, said exclusive OR gates and diodes forming a binary coded decimal diode matrix for providing a BCD output signal indicative of the least sensitively positioned transducer that has been actuated.

8. Apparatus for displaying pressure in digital form as described in claim 7, including means for decoding the BCD output signal and for providing a decimal signal to said digital display device.

9. Apparatus for displaying pressure in digital form as described in claim 8, said decoding means comprising a decoder/driver coupled between said BCD diode matrix and said digital display device.

10. Apparatus for displaying pressure in digital form as described in claim 1, said digital display device comprising an LED display; and including means for driving said LED display.

11. Apparatus for displaying pressure in digital form, which comprises: a plurality of pressure-sensitive transducers arranged for positioning vertically within a container for containing liquid wherein the pressure is to be sensed, said pressure-sensitive transducers being arranged from a most sensitive position to a least sensitive position and each of said pressure-sensitive transducers including a miniature device in which a diaphragm, responsive to pressure, switches an electrical circuit; electronic matrix means responsive to actuation of said transducers for providing an output signal indicative of the least sensitively positioned transducer that has been actuated, whereby a signal indicative of the pressure within the container is provided, said electronic matrix means comprising means for inhibiting transmission of output signals indicative of all of the more sensitively positioned transducers than the least sensitively positioned transducer will be provided, said inhibiting means comprising exclusive OR gates coupled to said pressure-sensitive transducers and to each other, and a diode coupled to the output of each of said exclusive OR gates, said exclusive OR gates and diodes forming a binary coded decimal diode matrix for providing a BCD output signal indicative of the least sensitively positioned transducer than has been actuated; means for decoding said BCD output signal; a digital display device coupled to the output of said decoding means, said digital display device being responsive to the decoded output signal for displaying in digital form the pressure in the container.

12. Apparatus for displaying pressure in digital form as described in claim 11, said decoding means comprising a decoder/driver coupled between said BCD diode matrix and said digital display device; and said digital display device comprising an LED display.

* * * * *